US008634397B2

(12) United States Patent
Johansson

(10) Patent No.: US 8,634,397 B2
(45) Date of Patent: Jan. 21, 2014

(54) ALLOCATION OF UPLINK RESOURCES

(75) Inventor: Magnus Johansson, Göteborg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 644 days.

(21) Appl. No.: 12/673,049

(22) PCT Filed: Aug. 13, 2007

(86) PCT No.: PCT/SE2007/050543
§ 371 (c)(1),
(2), (4) Date: Feb. 11, 2010

(87) PCT Pub. No.: WO2009/022949
PCT Pub. Date: Feb. 19, 2009

(65) Prior Publication Data
US 2011/0200021 A1    Aug. 18, 2011

(51) Int. Cl.
*H04W 4/00*    (2009.01)
(52) U.S. Cl.
USPC ............................................. 370/341
(58) Field of Classification Search
USPC ................................. 370/310–349
See application file for complete search history.

(56) References Cited

U.S. PATENT DOCUMENTS

| | | | |
|---|---|---|---|
| 2002/0114295 A1* | 8/2002 | Takahiro et al. | 370/329 |
| 2002/0144269 A1* | 10/2002 | Connelly | 725/49 |
| 2003/0048765 A1* | 3/2003 | Jang | 370/337 |
| 2003/0058796 A1* | 3/2003 | Anderson, Sr. | 370/236 |
| 2003/0179720 A1* | 9/2003 | Cuny | 370/310 |
| 2004/0224697 A1* | 11/2004 | Hakkinen et al. | 455/450 |
| 2005/0192018 A1* | 9/2005 | Jang | 455/450 |
| 2006/0079221 A1* | 4/2006 | Grant et al. | 455/423 |
| 2007/0133458 A1* | 6/2007 | Chandra et al. | 370/329 |
| 2007/0140165 A1* | 6/2007 | Kim et al. | 370/329 |
| 2007/0183353 A1* | 8/2007 | Malladi | 370/312 |
| 2008/0089250 A1* | 4/2008 | Jung | 370/276 |
| 2008/0233964 A1* | 9/2008 | McCoy et al. | 455/450 |
| 2008/0316959 A1* | 12/2008 | Bachl et al. | 370/329 |
| 2009/0143071 A1* | 6/2009 | Bergstrom et al. | 455/450 |

* cited by examiner

*Primary Examiner* — Kwang B Yao
*Assistant Examiner* — Juvena Loo

(57) ABSTRACT

A wireless telecommunications system with mobile terminals, MSs and a Base Station, BS, through which traffic to and from the MSs in a cell, is routed, so that there can be Down Link, DL, traffic from the BS of a cell to the MSs in that cell, and Up Link, UL, traffic from those MSs to the BS. At least part of the UL traffic is contention based, and DL data to an MS must be acknowledged by the MS. The method comprises letting the BS detect MSs in the cell whose DL traffic rate exceeds a certain limit, and also comprises a mechanism for allocating to said detected MSs an UL bandwidth which enables them to acknowledge DL traffic within a certain time period from its reception by the MS.

12 Claims, 9 Drawing Sheets

ALLOCATION OF UPLINK RESOURCES

TECHNICAL FIELD

The present invention discloses a method and a device for improved allocation of uplink resources.

BACKGROUND

Some modern cellular access technologies such as, for example, Mobile WiMAX, offer high data rates for single users. Data rates over 20 Mbits/s are possible in the downlink direction, i.e. to the user from the so called Base Station. A system such as for example the WiMAX system will comprise a number of such Base Stations, each of which is used to route the traffic to and from users in a specific area, a so called cell. The traffic from the Base Station to the users is referred to as Down Link, DL, and the traffic from the users to the Base Station is referred to as Up Link, UL. The terminal of a user is sometimes referred to as a Mobile Station, MS Most packet applications which use high data rates, such as HTTP and FTP, TCP uses retransmissions in order to ensure reliable data delivery. WiMAX and similar cellular access technologies are mainly used for transporting packet data.

Data sent via TCP needs to be acknowledged by the receiving party, and a characteristic in TCP is that the amount of unacknowledged data is limited by the size of the receive buffer, or receive window. The TCP receive window size depends on the configuration of the TCP/IP stack, but is typically in the area of 64 kbytes.

Using, as an example, a TCP receive buffer size with the typical size of 64 kbytes, and a data rate of 10 Mbit/s, it will take $64*10^3*8/10*10^6=51*10^{-3}$ seconds, i.e. in the area of 50 ms, to fill the receive buffer.

The example of 50 ms required to fill a receive buffer can be used to show that the latency for TCP acknowledgement in the example must be less than 15 ms, otherwise the sender will start to decrease the data rate, and the high data rate offered by the WiMAX access technology cannot be utilized. This may cause a problem in WiMAX systems, particularly in Mobile WiMAX systems, as explained in the following:

In Mobile WiMAX, data is transmitted in so called frames, with the frame length being 5 ms. Uplink bandwidth, i.e. transmit bandwidth for the MSs, is typically requested by the MSs and granted by the BS via contention-based bandwidth requests from the MSs. The concept of contention based requests is well known to those skilled in the field, and will thus not be explained in more detail here. However, the uplink latency in WiMAX systems when contention-based bandwidth request is used will usually be about 12 frames or 60 ms.

The latency of 60 ms is partly due to the WiMAX standard, and partly due to the processing time in the Base Station. However, to increase the Base Station's power in order to reduce the latency time would mean designing the Base Station's processing power for a case which may only occur rarely, something which is not desirable.

Thus, the latency caused by the Base Station, and in part also by the air interface, will be far too high to allow a downlink TCP throughput of 20 Mbits/s if the size of the TCP receive window in the MS is about 64 kbytes, which is a normal size.

SUMMARY

As explained above, there is thus a need for a mechanism by means of which the Up Link latency can be reduced in a wireless telecommunications system such as the WiMAX system.

This need is addressed by the present invention in that it provides a method for use in a wireless telecommunications system in which there can be a number of users with mobile terminals, MSs. In the system in which the invention may be applied, there is also a function, a Base Station, BS, through which traffic to and from the MSs in a specific area, a cell, is routed.

Traffic from the BS of a cell to the MSs in that cell is referred to as Down Link, DL, traffic, and traffic from the MSs to their Base Station is referred to as Up Link, UL, traffic.

In the system, at least part of the UL traffic is contention based, and DL data to an MS must be acknowledged by the MS. The method comprises letting the BS of a cell detect MSs in the cell whose DL traffic rate exceeds a certain limit, and the method also comprises a mechanism for allocating to those detected MSs an UL bandwidth which enables them to acknowledge DL traffic within a certain time period from the reception by the MS of the traffic.

Thus, by means of the invention, if an MS has a high DL traffic rate, it is assumed that such an MS will also have a need for a low UL latency, which is thus provided to the MS. In this way, many of the problems caused by low UL latency in for example a WiMAX system can be reduced or eliminated.

This and other advantages of the invention will become even more evident by means of the following detailed description.

BRIEF DESCRIPTION OF THE DRAWINGS

The invention will be described in more detail in the following, with reference to the appended drawings, in which.

DETAILED DESCRIPTION

Figure 1:
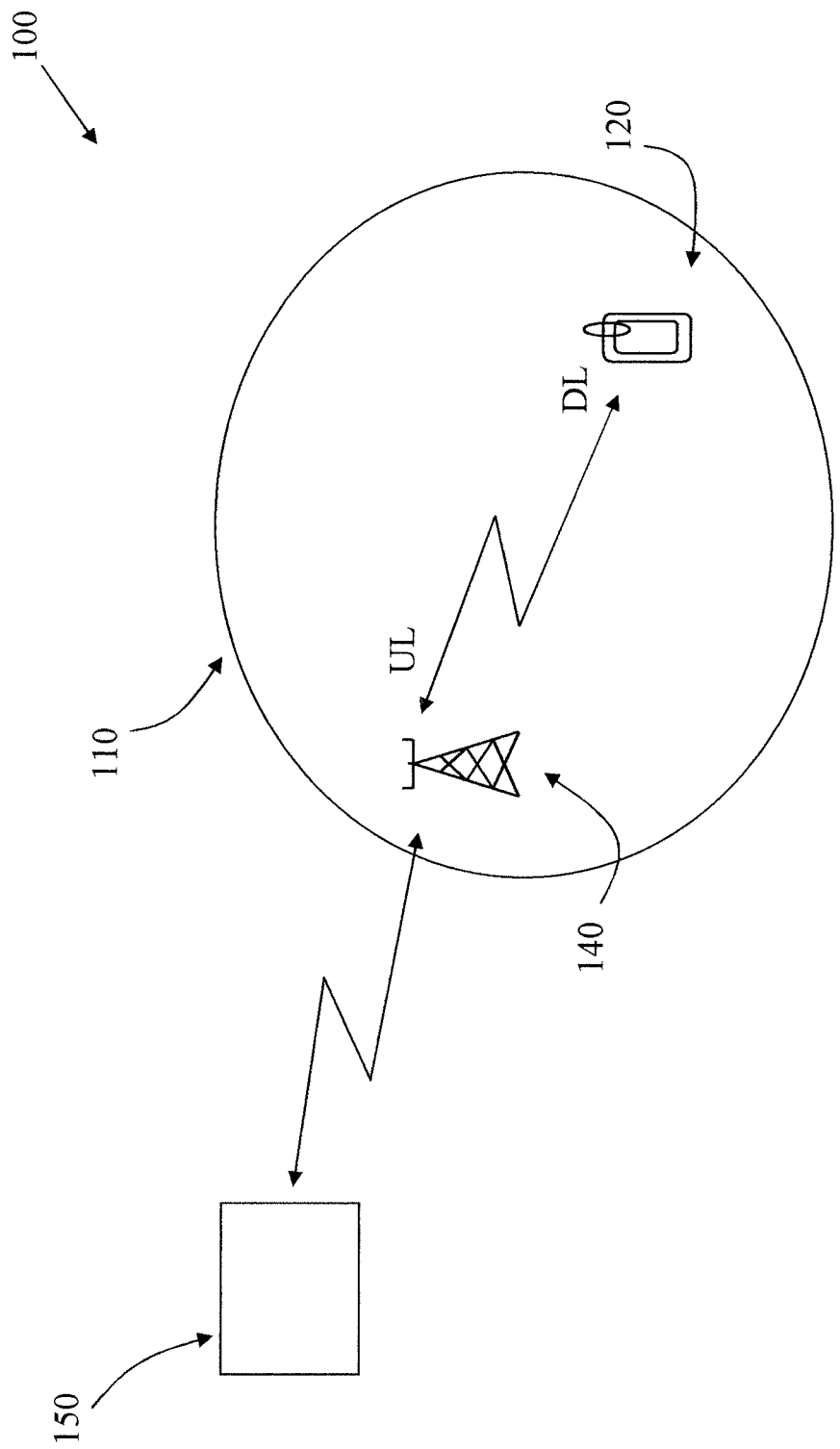
FIG. 1 shows a schematic overview of a part of a system in which the invention may be applied.

FIG. 1 shows an overview of a part of a system 100 in which the invention may be applied. The system 100 of FIG. 1 is a cellular wireless access network with a plurality of cells, one of which, 110, is shown in FIG. 1. In each cell there can be a number of Mobile Stations, MSs, and as an example of this, FIG. 1 shows an MS 120 in the cell 110.

In addition, the system 100 comprises a number of Base Stations, BSs, one for each of the cells, with the base stations of the cell 110 being shown as 140 in FIG. 1. The function of the BSs varies between different standards, but in the WiMAX system, for which the invention is primarily intended, the traffic to and from an MS in a cell is routed via the BS of that cell.

Traffic from the BSs to the MSs is referred to as Down Link, DL, traffic, while traffic in the other direction, i.e. from the MSs to the BSs is referred to as Up Link, UL, traffic FIG. 1 also shows a party 150 which is external to the cell 110, the party 150 being intended to illustrate a generic sender/transmitter, in other words a party with whom the MS 120 of the cell 110 exchanges traffic. The sender/transmitter 150 can be a number of different parties, such as a computer, a server, or an MS of another cell in the system 100.

Figure 2:
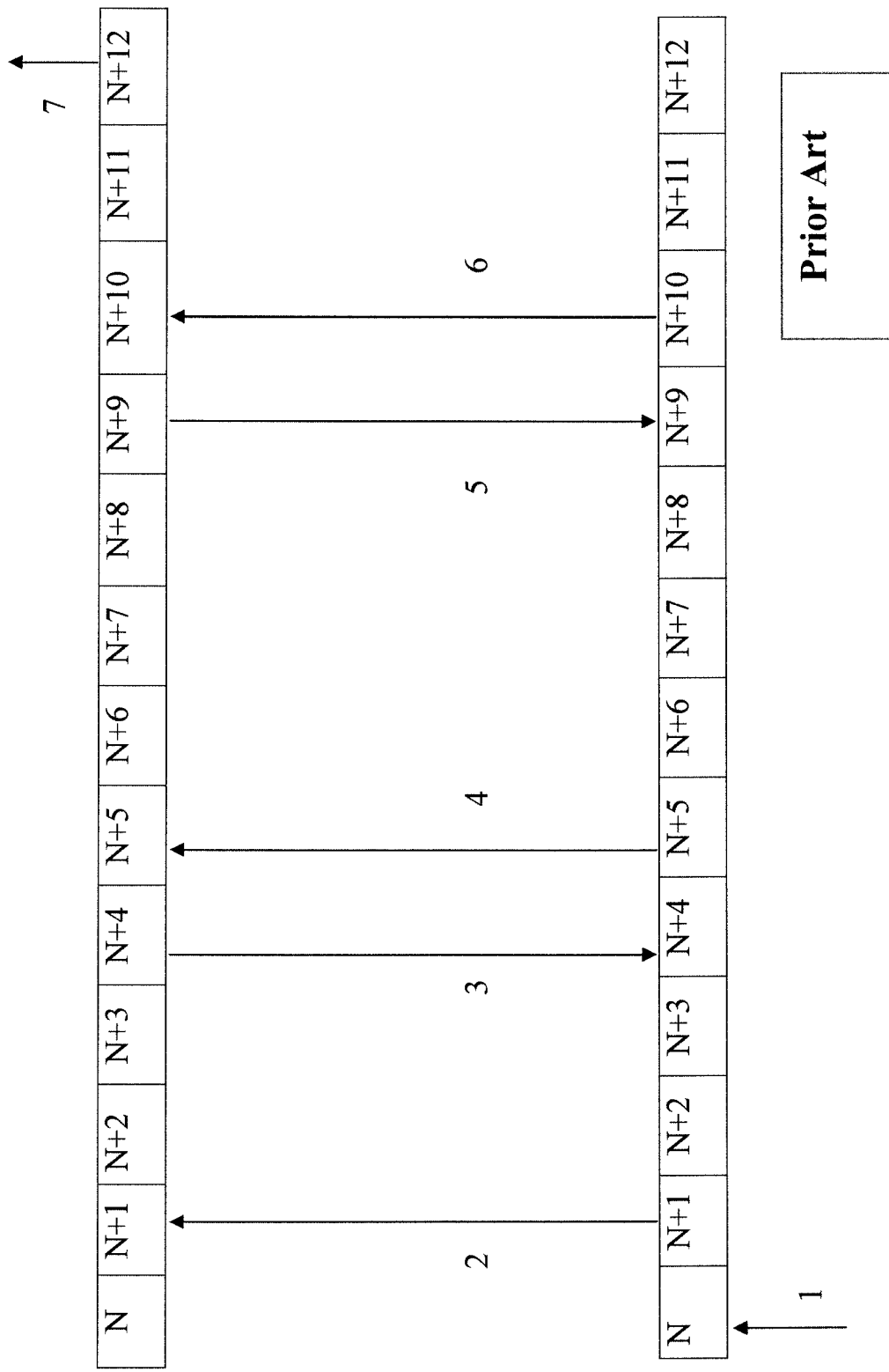
FIG. 2 shows an event diagram of prior art.

FIG. 2 is an event diagram which shows the UL latency in a WiMAX system at present. Since WiMAX, as mentioned, uses frames, the event diagram is shown in increments of frames, the frames being shown both at the bottom and top of the diagram.

The numbers below refer to the corresponding numbers next to the arrows in FIG. 2.

1: The MS receives payload from the application, such as, for example a TCP ACK, the payload being intended for further transmission via the BS of the MS.
2: The MS signals to the BS that it needs UL bandwidth, which it does through a so called Bandwidth request code.
3: The BS transmits a so called CDMA allocation IE, information element. This is an uplink allocation addressed to the user who transmitted the Bandwidth request code. The size of the uplink allocation is set so that the user can transmit a Bandwidth Request Header, using the most robust modulation and coding scheme. This is due to the fact that the BS does not know which MS that transmitted the code, and thus does not know the channel quality of the MS.
4: The MS transmits a Bandwidth Request Header, specifying the size of the payload it wishes to transmit.
5: The BS transmits UL allocation to the MS. The size of the allocation is adapted to the payload size, and the modulation and coding scheme is adapted to the channel quality of the MS.
6: The MS transmits the payload to the BS.
7: The BS sends the payload to the next node in the system, which in a WiMAX system is a so called ASN GW, Access Service Network Gateway.

As can be seen from FIG. 2, the procedure described above may take up to 12 frames, which in a normal WiMAX system would correspond to 60 ms, since a frame is 5 ms long. As explained initially, a latency which exceeds 15 ms may cause a reduced data rate in a WiMAX system, so the process shown in FIG. 2 is clearly one which needs improvement. One way of improving on the process shown in FIG. 2 would be to allocate a high UL bandwidth to all of the MSs in a cell for every frame, but this would be wasteful, since not all of the MSs in the cell would need the UL bandwidth thus allocated.

An alternative and more attractive improvement to the process of FIG. 2 is offered by the present invention, since the inventors of the present invention have realized that one way of identifying which of the MSs in a cell that need a low UL latency is to identify MSs which have a high DL throughput, and to apply a mechanism which enables low latency in the uplink for those MSs, i.e. to allocate an UL bandwidth which enables them to acknowledge DL traffic within a certain time period from its reception by the MS.

Figure 3:
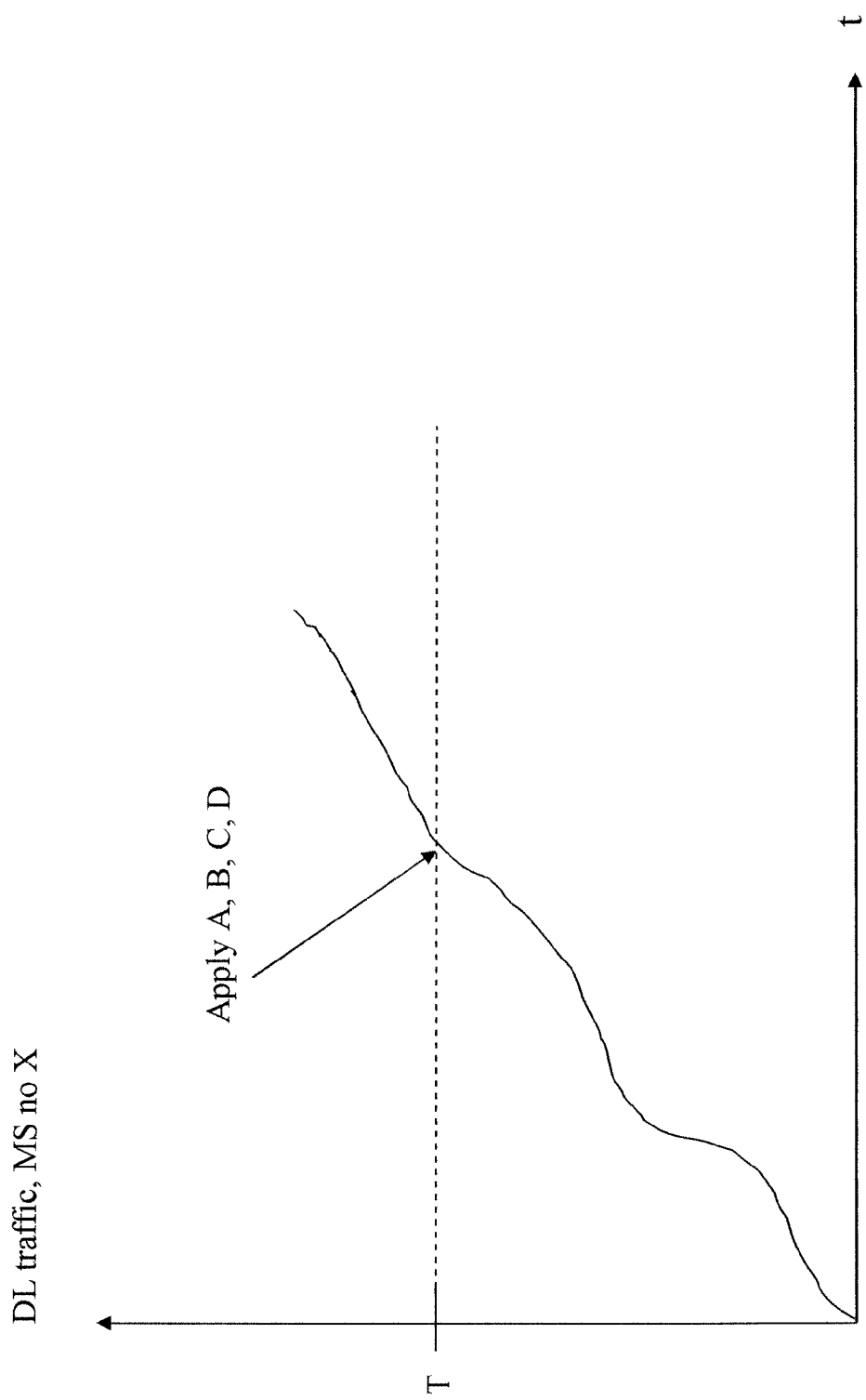
FIG. 3 shows a mechanism of the invention.

The present invention discloses a number of alternative embodiments for accomplishing the goal stated above, i.e. to offer an increased UL bandwidth to MSs which have a high DL traffic rate. Those embodiments will be described below, and can be referred to as embodiments A, B, C and D. FIG. 3 shows the basic principle of this: in FIG. 3, the DL traffic of an MS, "MS number X" in a cell, is plotted as a function of time. If the DL traffic of that MS exceeds a certain threshold T, one of the mechanisms A, B, C, or D is applied to it.

The choice of mechanism could be based on, for example, the DL data rate of the MS. As an alternative, it is entirely possible to have more than one DL threshold, so that there, for example, could be one threshold for each of the mechanisms A, B, C and D.

Thus, when the BS detects an MS which passes the threshold shown in FIG. 3, one of the mechanisms A-D will be applied. The mechanisms will be described in more detail below, with reference to FIGS. 4-7:

Mechanism A:
When a contention based message such as the Bandwidth Request code of the WiMAX system is received, indicating that an MS in the cell wishes to transmit data, always allocate enough bandwidth to transmit a TCP acknowledgement for the MS which has exceeded the threshold. The BS does not know which MS that transmitted the Bandwidth Request code, but allocates sufficient bandwidth to the MS which exceeded the threshold "T" of FIG. 3.

Figure 4:
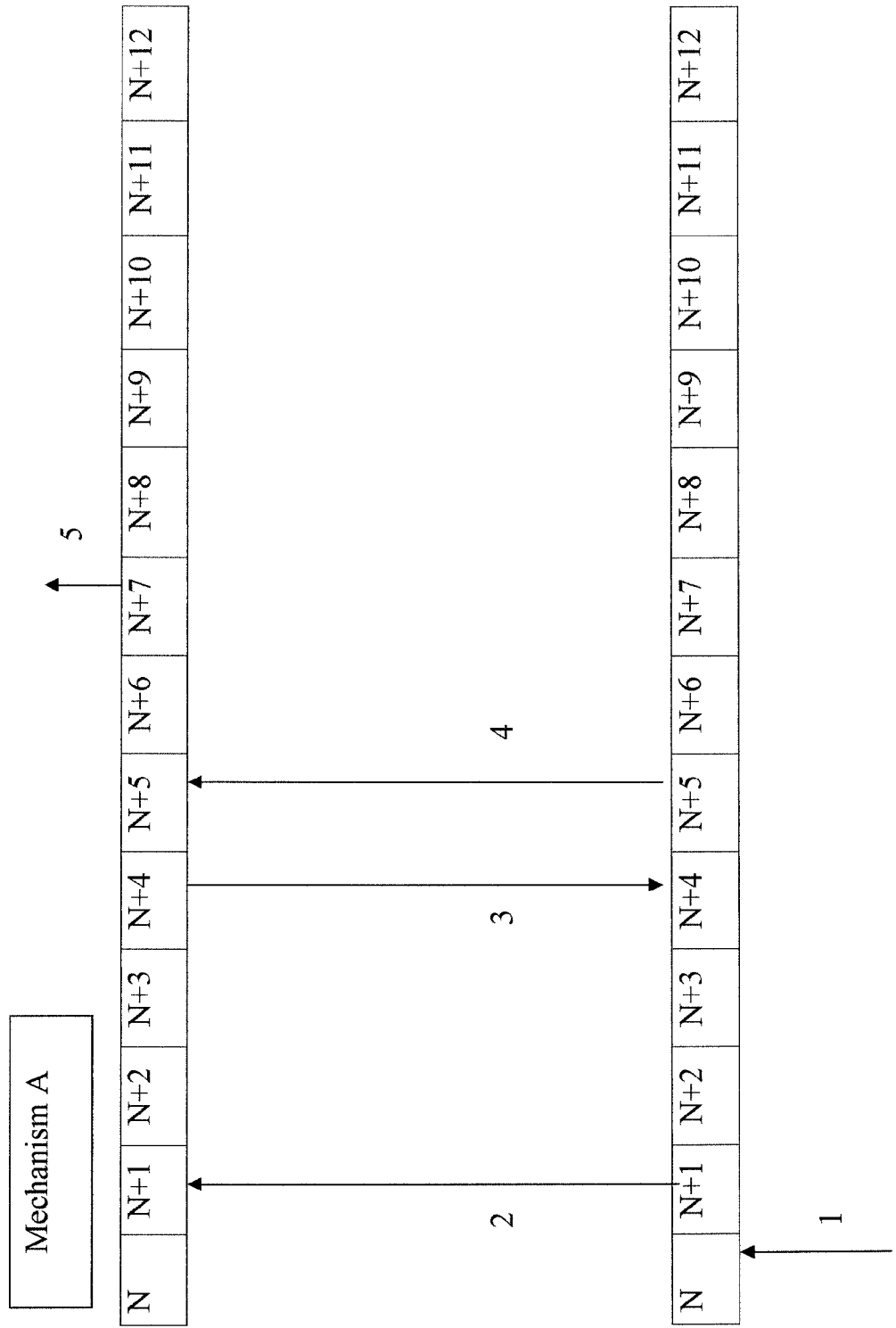
FIGS. 4-7 show event diagrams of different embodiments of the invention.

An event diagram corresponding to mechanism A is shown in FIG. 4, with the numbers below corresponding to the numbers next to the arrows of FIG. 4:

1: The MS receives payload from an application, such as for example a TCP ACK, the payload being intended for further transmission via the BS of the MS.
2. The MS sends a Bandwidth Request code to the BS.
3. The BS transmits a so called CDMA allocation IE, information element. This is an uplink allocation addressed to the user who transmitted the Bandwidth request code. The size of the uplink allocation is set so that the user can transmit a Bandwidth Request Header, using the most robust modulation and coding scheme. This is due to the fact that the BS does not know which MS that transmitted the code, and thus does not know the channel quality of the MS.
4. The MS sends a TCP ACK to the BS.
5. The BS sends the TCP ACK to the ASN Gateway.

As can be seen in FIG. 4, the entire sequence takes 7 frames, i.e. 35 ms. Thus, the goal of 15 ms is not reached by means of this mechanism, but a significant improvement is made over the prior art solution which offers 60 MS.

Mechanism B:
Allocate a specific channel to an MS which exceeded the DL threshold, and allocate sufficient bandwidth to transmit a TCP acknowledgement when a bandwidth request is received from such an MS on said specific channel. An example of a channel which can be used for this is the CQICH, the Channel Quality Indicator Channel in WiMAX.

Figure 5:
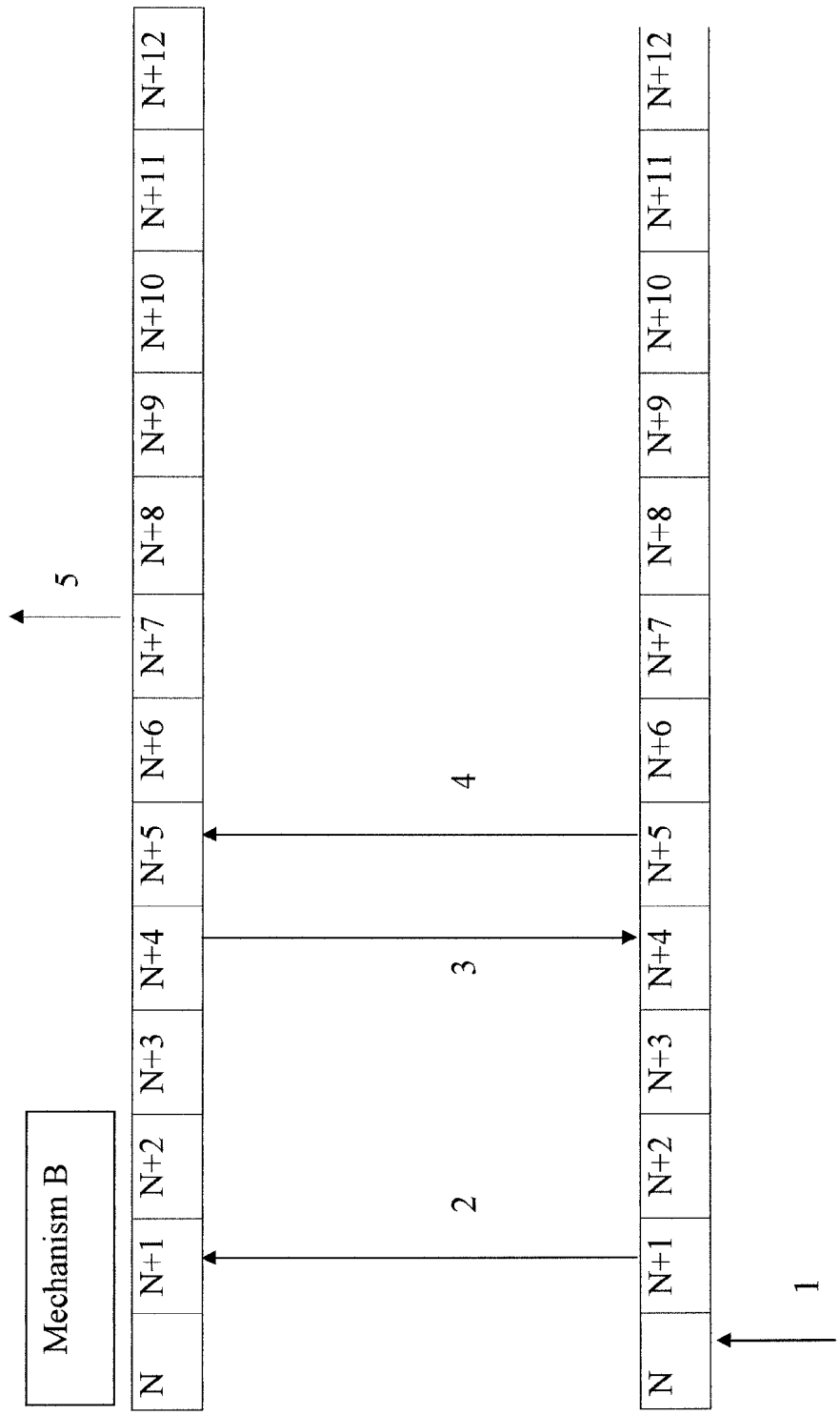

An event diagram corresponding to mechanism B is shown in FIG. 5, with the numbers below corresponding to the numbers next to the arrows of FIG. 5:

1: The MS receives payload from an application, such as for example a TCP ACK, the payload being intended for further transmission via the BS of the MS.
2: The MS transmits a Bandwidth Request to the BS.
3. The BS sends an UL allocation IE, information element to the MS. The BS knows which MS that sent the request from the ID of the CQICH. The BS allocates sufficient UL resources for a TCP ACK, and chooses modulation and coding scheme according to the channel quality of the MS
4. The MS sends a TCP ACK to the BS.
5. The MS sends the TCP ACK to the ASN Gateway.

As can be seen in FIG. 5, in similarity to mechanism A, the entire sequence takes 7 frames, i.e. 35 ms. Thus, the goal of 15 ms is not reached by means of this mechanism, but a significant improvement is made over the prior art solution which offers 60 ms. Mechanism B may be said to have an advantage in comparison to mechanism A since the modulation and coding may be adapted to the MS.

Figure 6:
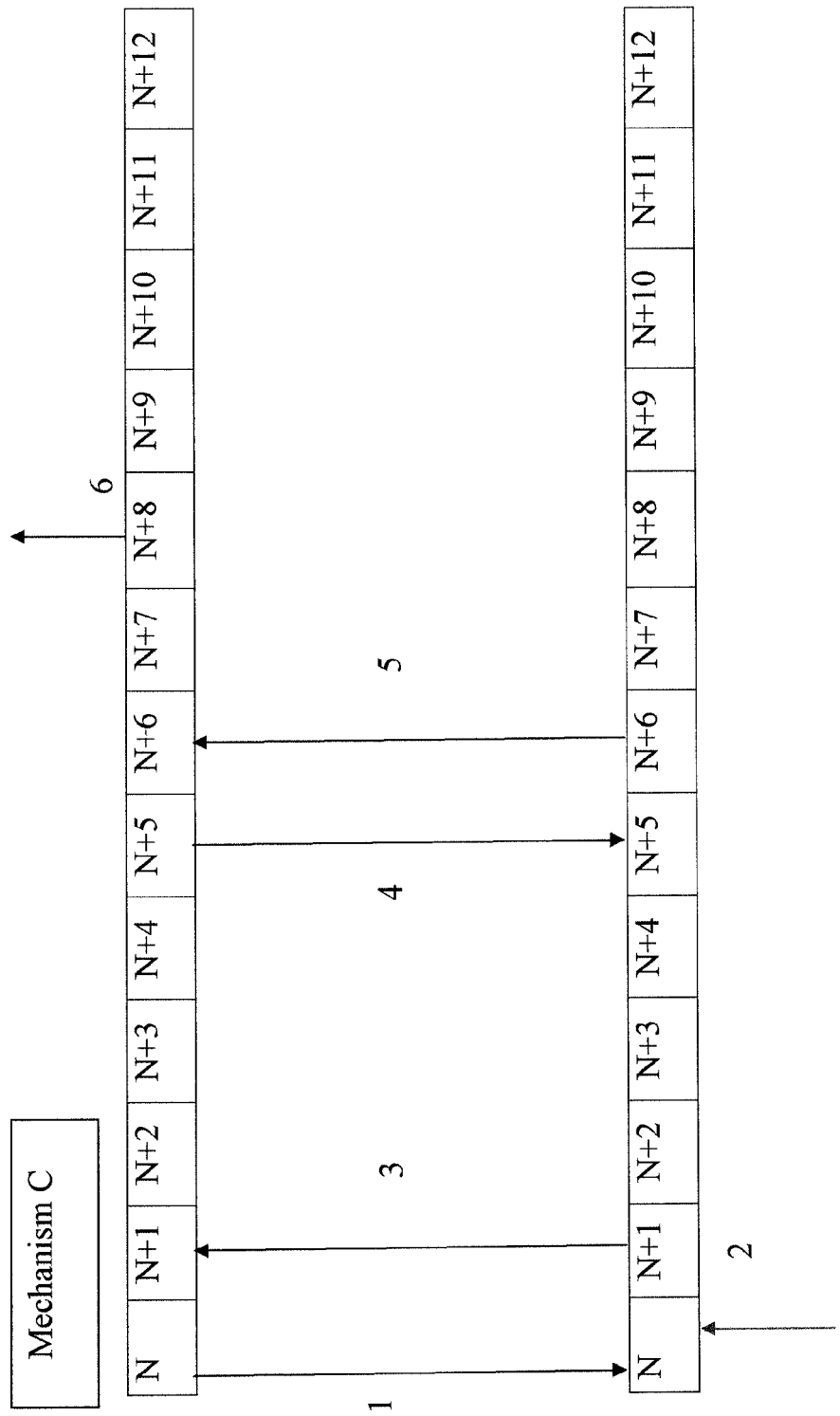

Mechanism C:
Allocate enough bandwidth to transmit a Bandwidth Request header in each frame to an MS which exceeded the DL threshold. An event diagram corresponding to mechanism C is shown in FIG. 6, with the numbers below corresponding to the numbers next to the arrows of FIG. 6:

1: The BS allocates UL resources to those MSs which have exceeded the DL traffic threshold, said UL resources being sufficient for the MSs to transmit a so called Bandwidth Request header in each frame. The UL resources may be allocated per frame, or "until further notice". In either case, the UL resource allocation may be kept up until the data rate reaches a desired level.

2: The MS receives payload from an application, such as for example a TCP ACK, the payload being intended for further transmission via the BS of the MS.

3. The MS utilizes the allocated UL resources to send a Bandwidth Request Header to the BS.

4. The BS sends an UL allocation IE, information element to the MS.

5. The MS sends the TCP ACK to the BS.

6. The BS sends the TCP ACK to the ASN Gateway.

As can be seen in FIG. 6, in similarity to mechanism A, the entire sequence takes 8 frames, i.e. 40 ms. Thus, the goal of 15 ms is not reached by means of this mechanism, but an improvement is made over the prior art solution which offers 60 ms.

Figure 7:
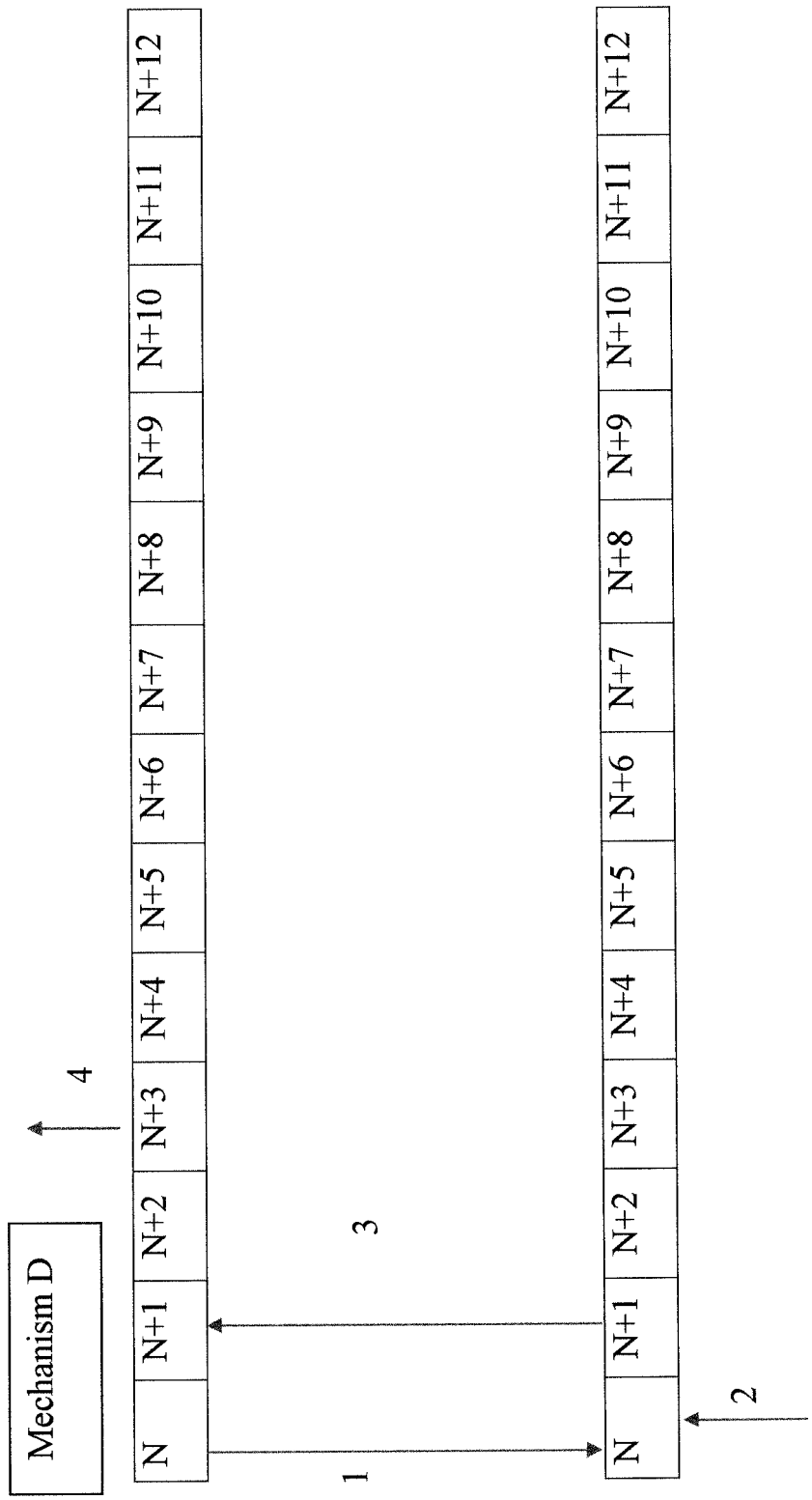

Mechanism D:

Allocate enough bandwidth for the MS to transmit TCP acknowledgement in each frame. An event diagram corresponding to mechanism D is shown in FIG. 7, with the numbers below corresponding to the numbers next to the arrows of FIG. 7:

1. The BS allocates UL resources to those MSs which have exceeded the DL traffic threshold, said UL resources being sufficient for the MSs to transmit a TCP ACK in each frame. The UL resources may be allocated per frame, or "until further notice". In either case, the UL resource allocation may be kept up until the data rate reaches a desired level.

2. The MS receives payload from an application, such as for example a TCP ACK, the payload being intended for further transmission via the BS of the MS.

3. The MS sends the TCP ACK to the BS.

4. The BS sends the TCP ACK to the ASN Gateway.

Thus, as has been shown above, with the use of the present invention, a high DL traffic rate can be obtained with a minimum of wasted UL resources.

As can be seen from FIG. 7, the entire procedure of mechanism D takes 4 frames, i.e. 20 ms, which is obviously a significant improvement over the prior art solution which offers 60 ms.

Figure 8:
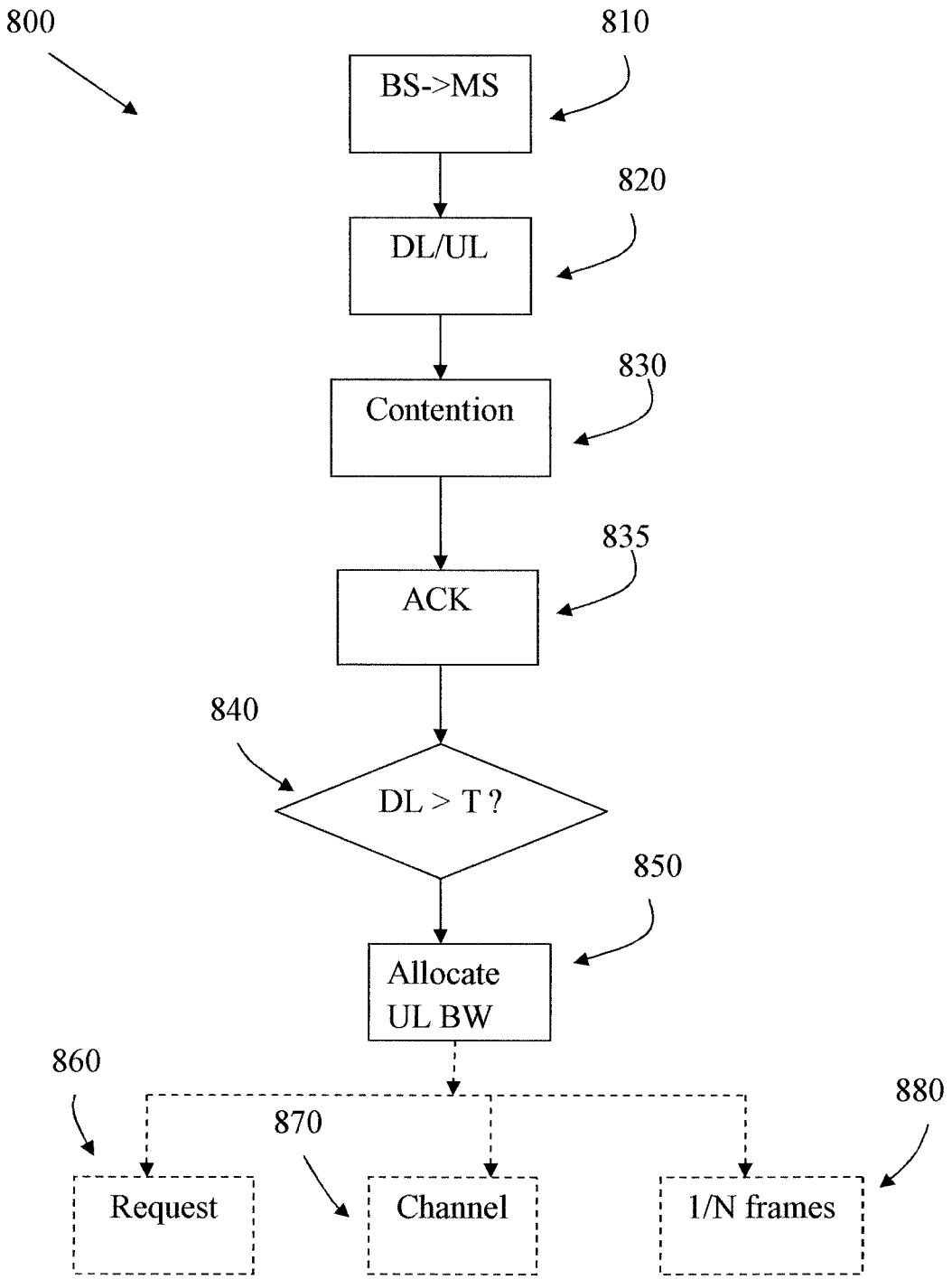
FIG. 8 shows a flow chart of a method of the invention.

FIG. 8 shows a flow chart of a method 800 of the invention. As shown in step 810, the invention can be applied in a system in which there is a Base Station, a BS, through which traffic to and from the MSs in a specific area, a cell, is routed.

As shown in step 820, in the system in which the invention is applied, there can be Down Link, DL, traffic from the BS of a cell to the MSs in that cell, and Up Link, UL, traffic from those MSs to their BS.

Step 830 shows that at least part of the UL traffic in the system should be contention based. The notion of "contention based" traffic is well known to those skilled in the field, and will thus not be explained in detail here. Step 835 shows that in the system, DL data to an MS must be acknowledged 835 by the MS.

As shown in step 840, the method of the invention comprises letting the BS of a cell detect MSs in the cell whose DL traffic rate exceeds a certain limit, in this case the threshold T which has been shown in FIG. 3. Step 850 shows that according to the invention, there is a mechanism for allocating to such detected MSs an UL bandwidth which enables them to acknowledge DL traffic within a certain time period from its reception by the MS.

As indicated in steps 860, 870 and 880, the mechanism for allocating UL bandwidth to the MSs may have different embodiments within the scope of the invention:

As shown in step 860, the mechanism may comprises letting a BS allocate sufficient UL bandwidth for data acknowledgement to one of said detected MS which transmits a contention based message to the BS indicating that it wishes to transmit data, the contention based message being, for example, the Bandwidth Request Code of the WiMAX system.

In an alternative embodiment, as indicated in step 870, the mechanism comprises allocating a certain channel to at least one of the detected MSs with a high DL traffic rate, and then allocating sufficient UL bandwidth for data acknowledgement to the at least one MS which transmits a message to the BS on said channel indicating a request to transmit data on that channel. The request can for example be the Bandwidth Request Header of the WiMAX system, and the channel which is allocated may, for example, be a channel for conveying a channel quality indicator to the BS, such as the CQICH channel.

As indicated in step 880, in the system in which the invention is applied, the UL transmissions may take place in time frames, and the mechanism for allocating UL bandwidth may then comprise allocating, in each of a certain number of said frames, i.e. in one of N frames, 1/N, sufficient UL bandwidth to at least one of said detected MSs to transmit a message indicating that it wishes to transmit data. The message in question may be the Bandwidth Request Header. Thus, in FIGS. 6 and 7, which show mechanisms C and D for allocating UL bandwidth, in each frame UL bandwidth is allocated, which is suitable, but does not need to be so. Instead, this may be done in one out of every N frames, where N is an arbitrarily chosen integer.

As an alternative, the mechanism for allocating UL bandwidth may comprise allocating, in each of a certain number of said frames, sufficient UL bandwidth to at least one of said detected MSs for data acknowledgement, i.e. for TCP ACK.

The invention is also directed towards a Base Station with functions according to the invention. A schematic block diagram of such a base station 900 is shown in FIG. 9.

Figure 9:
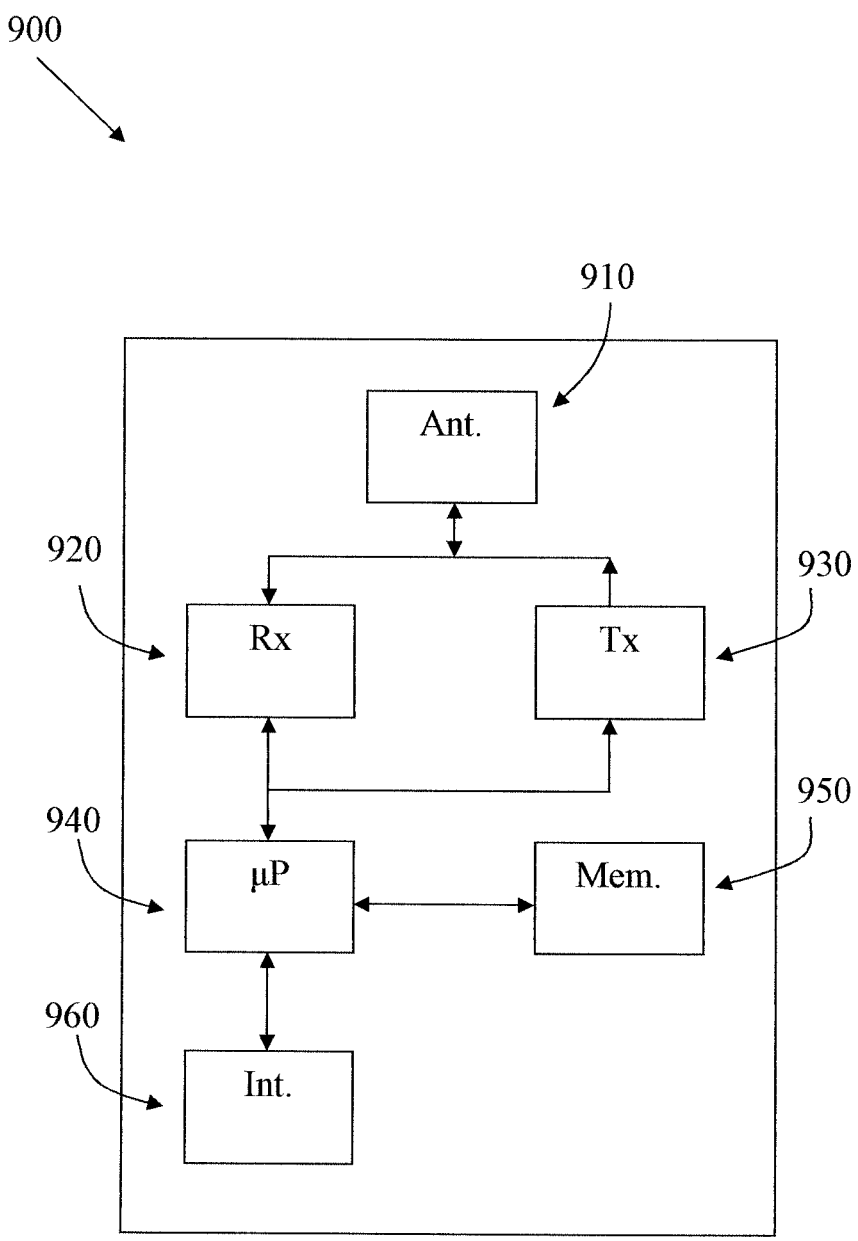
FIG. 9 shows a block diagram of a Base Station of the invention.

As can be seen in FIG. 9, the Base Station 900 of the invention comprises an antenna 910 for reception and transmission of information from/to the MSs in the cell of the Base Station, as well as also possibly comprising an interface 960 towards other nodes in the system. This interface may be, for example, a landline interface or an interface towards networks such as the Internet etc. As indicated in FIG. 9, this interface is suitably controlled by the computer 940, and the traffic which is exchanged via the interface 960 is also suitably routed via the computer 940.

The Base Station 900 also comprises a receiver part, Rx, 920, a transmitter part Tx 930, a computer such as a microprocessor 940 and a memory 950.

The antenna 910 together with the receiver 920, the transmitter 930, the computer 940 and the memory 950 may be used for detecting MSs in an area such as a cell whose DL traffic rate exceeds a certain limit, such as the threshold T shown in FIG. 3, the detection being as follows: DL traffic to an MS originates not from the BS but from an outside sender such as the sender 150 of FIG. 1.

The antenna/interface 910 is used together with the receiver 920 to receive traffic from the external party, the traffic is then processed by the computer 940, and redirected to the MSs in the cell via the transmitter 930 and the antenna 910. The computer 940 may use either the received or the outgoing traffic for comparisons with a threshold which is suitably stored in the memory 950.

The computer 940 notes which MSs that should be allocated the UL bandwidth according to the invention, and may store a list of such MSs in the memory 950.

The invention is not limited to the examples of embodiments described above and shown in the drawings, but may be freely varied within the scope of the appended claims.

The invention claimed is:

1. A method for use in a wireless telecommunications system having a number of users with mobile terminals (MSs), and in which wireless telecommunications system there is a base station (BS) through which traffic to and from the MSs in a specific area, a cell, is routed, there being downlink (DL) traffic from the BS of a cell to the MSs in that cell and uplink (UL) traffic from those MSs to the BS, the method comprising the steps of:
    detecting, by the BS, MSs in the cell whose DL traffic rate exceeds a certain limit; and
    allocating to said detected MSs an UL bandwidth which enables each of said detected MSs to acknowledge DL traffic within a certain time period from reception of said DL traffic by such MS;
    wherein at least part of the UL traffic is contention-based; and
    wherein DL data to an MS must be acknowledged by the MS.

2. The method of claim 1, further comprising the step of allocating, by a BS, sufficient UL bandwidth for data acknowledgement to one of said detected MS which transmits a contention based message to the BS requesting to transmit data.

3. The method of claim 1, further comprising the step of allocating a certain channel to at least one of said detected MSs, and allocating sufficient UL bandwidth for data acknowledgement to said at least one MS which transmits a message to the BS on said channel requesting to transmit data.

4. The method of claim 3, according to which said channel is for conveying a channel quality indicator to the BS.

5. The method of claim 1, wherein the UL transmissions take place in time frames, and further comprising the step of allocating, in each of a certain number of said frames, sufficient UL bandwidth to at least one of said detected MSs to transmit a message requesting to transmit data.

6. The method of claim 1, wherein the UL transmissions take place in time frames, and further comprising the step of allocating, in each of a certain number of said frames, sufficient UL bandwidth to at least one of said detected MSs for data acknowledgement.

7. A base station (BS) for use in a wireless telecommunications system, in which wireless telecommunications system there are a number of users with mobile terminals (MSs) said BS for routing traffic to and from the MSs in a specific area or a cell in the wireless telecommunications system, there being downlink (DL) traffic from the BS to the MSs, and uplink (UL) traffic from the MSs to the BS, the BS comprising:
    a processor configured for detecting MSs in said area whose DL traffic rate exceeds a certain limit; and
    the processor further configured for allocating to said detected MSs an UL bandwidth which enables the detected MSs to acknowledge DL traffic within a certain time period from reception of said DL traffic by the MS;
    wherein at least part of the UL traffic is contention-based; and
    wherein DL data to an MS must be acknowledged by the MS.

8. The base station of claim 7, in which the processor is further configured to allocate sufficient UL bandwidth for data acknowledgement to one of said detected MSs which transmits a contention based message to the BS indicating that it wishes to transmit data.

9. The base station of claim 7, in which the allocating means allocates the processor is further configured to allocate a certain channel in the system to at least one of said detected MSs, and to allocate sufficient UL bandwidth for data acknowledgement to one of said MSs which transmits a message to the BS on said channel requesting to transmit data.

10. The base station of claim 9, in which said channel conveys a channel quality indicator from the MSs to the BS.

11. The base station of claim 7, wherein it receives the UL transmissions in time frames, and in which the processor is further configured to allocate, in each of a certain number of said frames, sufficient UL bandwidth to at least one of said detected MSs to transmit a message indicating that it wishes to transmit data.

12. The base station of claim 7, wherein it receives the UL transmissions in time frames, and in which the processor is further configured to allocate, in each of a certain number of said frames, sufficient UL bandwidth to at least one of said detected MSs for data acknowledgement.

* * * * *

UNITED STATES PATENT AND TRADEMARK OFFICE
CERTIFICATE OF CORRECTION

PATENT NO. : 8,634,397 B2  Page 1 of 1
APPLICATION NO. : 12/673049
DATED : January 21, 2014
INVENTOR(S) : Johansson It is certified that error appears in the above-identified patent and that said Letters Patent is hereby corrected as shown below:

In the Drawings

In Fig. 5, Sheet 5 of 9, delete "  " and insert --  --, therefor.

Signed and Sealed this
Eighth Day of July, 2014

Michelle K. Lee
*Deputy Director of the United States Patent and Trademark Office*